May 11, 1965
A. E. ORMSBY
3,182,828
TOWING APPARATUS
Filed March 31, 1959
2 Sheets-Sheet 1
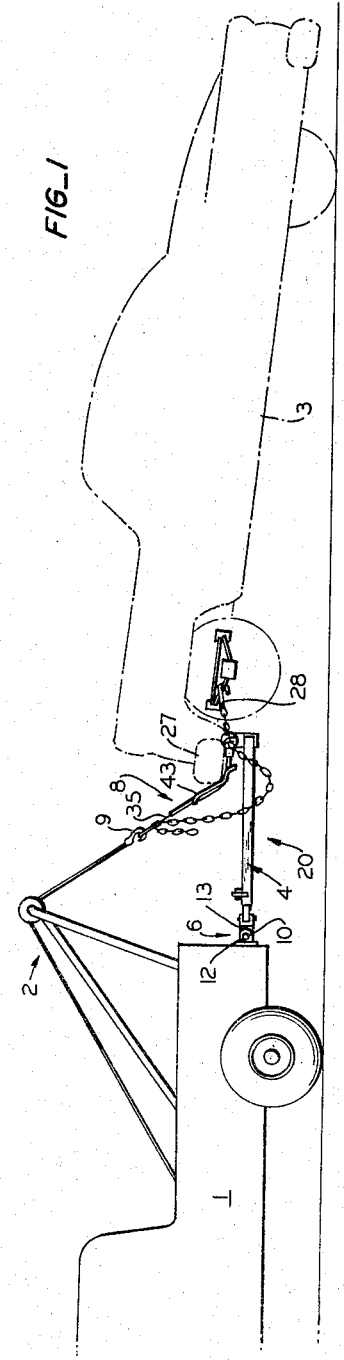
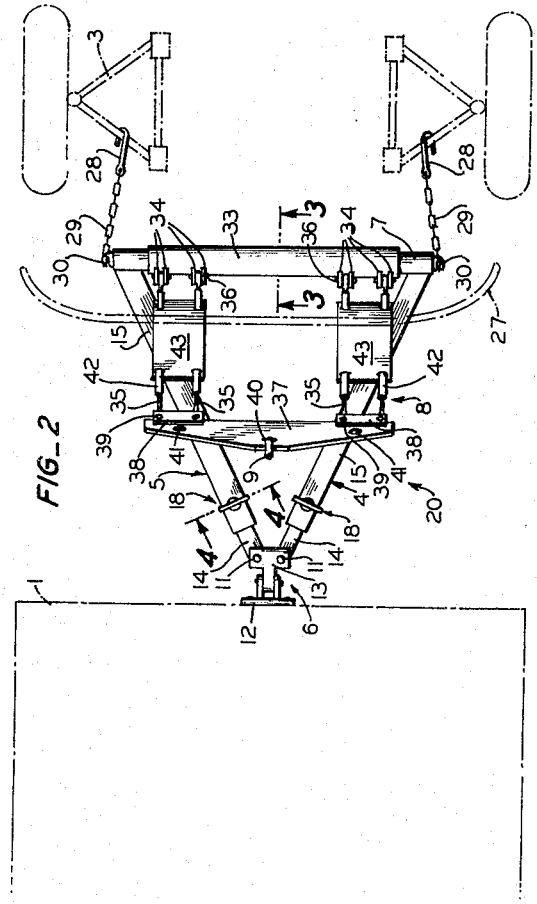
INVENTOR.
ARWIN E. ORMSBY
BY
Boykin, Mohler + Wood
ATTORNEYS May 11, 1965 A. E. ORMSBY 3,182,828
TOWING APPARATUS
Filed March 31, 1959 2 Sheets-Sheet 2
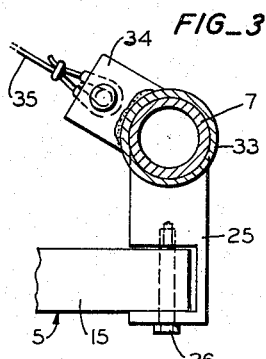
FIG_3
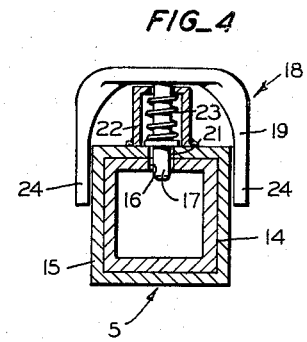
FIG_4
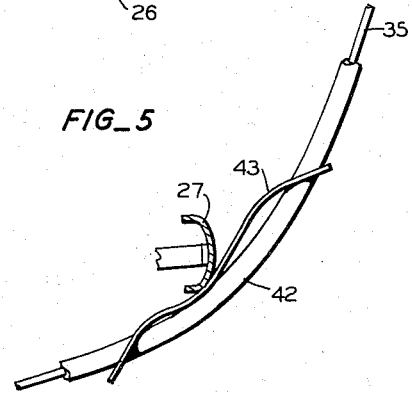
FIG_5
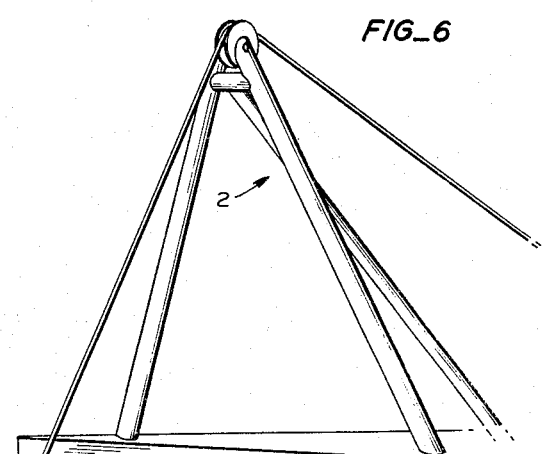
FIG_6
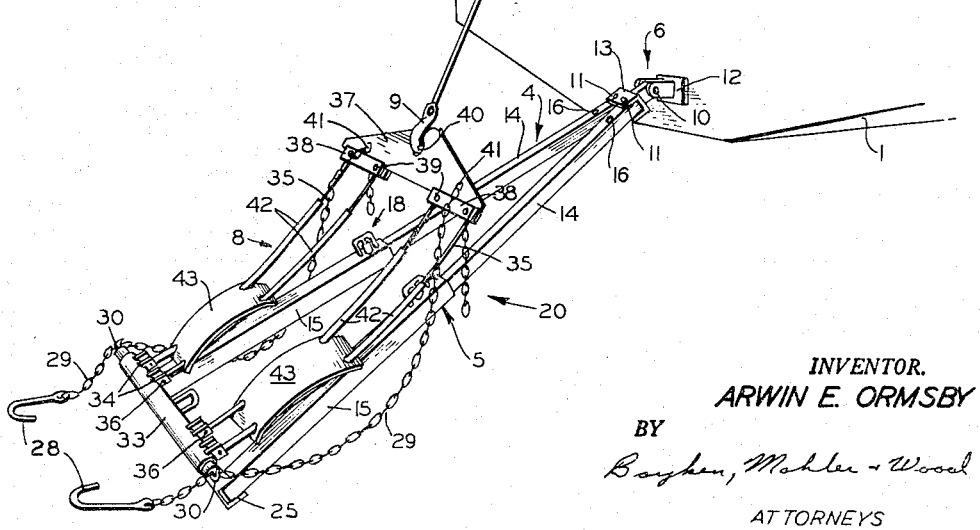
INVENTOR.
ARWIN E. ORMSBY
BY
*Boyken, Mohler & Wood*
ATTORNEYS

United States Patent Office 3,182,828
Patented May 11, 1965

3,182,828
TOWING APPARATUS
Arwin E. Ormsby, 8435 Baldwin St., Oakland, Calif.
Filed Mar. 31, 1959, Ser. No. 803,135
2 Claims. (Cl. 214—86)

The present invention relates to towing apparatus and more particularly to towing slings of the type adapted for use in towing automobiles, trucks and other motor vehicles of a like nature by wreckers and other towing vehicles.

Prior art towing slings have many apparent disadvantages in their operation and construction. Some of such slings involve a rather difficult operation in making the connection between the towing vehicle and the vehicle to be towed. Others are expensive in construction and are bulky and cumbersome. For the most part prior art towing slings provide no cushioning means for protecting the finish and decorative parts of the vehicle to be towed from wear and damage resulting from direct contact with the towing sling. Moreover, they provide no protection from wear and damage for the parts of the towing sling itself. Slings which do provide some cushioned protection necessitate frequent, costly and time-consuming replacement of the cushioning parts because of damage due to cutting and wearing action between the cushioning parts of the sling and the vehicle being towed.

The primary object of the present invention is the provision of an improved towing sling that allows ease of operation, a dependable and sound yet flexible connection between the towing vehicle and the vehicle being towed, and maximum safety and protection to the towing vehicle, to the vehicle being towed and to the towing sling itself.

Another object of the present invention is the provision of a towing sling that will adjust to meet the needs of any vehicle of the type commonly towed by a towing vehicle of the type herein mentioned and provide a sound, safe, connection between the towing vehicle and the front or rear of the vehicle in tow, preventing lurching or side sway of the vehicle being towed.

Still another object of the present invention is the provision of a towing sling of strong, light and inexpensive construction requiring very little maintenance. The relatively simple construction provides for quick and inexpensive replacement of any parts which may wear.

Yet another object of the present invention is the provision of a towing sling which by its cushioning features allows a minimum of metal-to-metal contact between the towing vehicle and the vehicle in tow thus considerably reducing the possibility of damage through such contact.

A further object of this invention is the provision of a towing sling which may be easily and readily connected to a vehicle to be towed and which automatically positions the towed vehicle properly with respect to the towing vehicle.

Other objects and advantages will become apparent from the following description taken in connection with the accompanying drawings:

FIG. 1 is a side elevational view of the towing sling of this invention shown attached to a towing vehicle and to an automobile in towing position;

FIG. 2 is a top plan view of the towing sling of FIG. 1 and portions of the towing vehicle and the towed vehicle;

FIG. 3 is a greatly enlarged cross sectional view as seen from line 3—3 of FIG. 2;

FIG. 4 is a greatly enlarged cross sectional view as seen from line 4—4 of FIG. 2;

FIG. 5 is an enlarged side elevational view of one of the cushioning means of this invention; and, FIG. 6 is a perspective view of the towing sling of FIG. 1 attached to a towing vehicle and lowered to a position at which it is ready to be connected to the vehicle to be towed.

In general, the towing apparatus of this invention is adapted to be used in conjunction with a wrecker type vehicle 1 provided with lifting means, such as a derrick arrangement 2, as seen best in FIGS. 1, 6. The towing sling performs two primary functions with respect to a disabled or towed vehicle 3: the function of towing the vehicle 3 while keeping the disabled vehicle 3 at a steady predetermined space relationship from the towing vehicle 1, and that of safely lifting either end of the vehicle 3 to be towed from the ground to facilitate safe and easy towing.

The towing apparatus of this invention, generally designated 20, comprises a tow bar arrangement including a pair of convergently extending, telescoping tow bars 4, 5 which are connected at their convergent ends by a universal connection 6 to the towing vehicle 1, and swingably connected at their divergent ends to a spreader bar 7. The function of safely lifting either end of the disabled vehicle 3 is performed by a suspension arrangement, generally designated 8 in conjunction with the hoisting or lifting mechanism 2 of the tow truck 1. This sling arrangement is connected at its lower end to spreader bar 7 and at its upper end to the hoist hook 9 of the hoisting mechanism or lifting means 2 of tow truck 1.

More specifically, the universal connection 6 which connects the convergent ends of extendable tow bars 4, 5 to the tow truck 1 comprises a mounting plate 12 and a connecting link 13. The mounting plate 12 is adapted to be rigidly attached to the towing vehicle 1 and is provided with means for swingably connecting link 13 thereto by pivot 10 allowing link 13 to swing in a generally vertical arc about the horizontal axis of pivot 10. Link 13 is formed to connect the convergent ends of extendable tow bars 4, 5 on pivots 11 for swinging movements describing generally horizonal arcs about the generally vertical axes of pivot 11. Thus extendable tow bars 4, 5 have considerable freedom for swinging movement horizontally and vertically by universal connection 6.

Extendable tow bars 4, 5 are of identical construction and each comprises an inner tubular section 14 (FIG. 4) which is received within and is slidable with respect to an outer tubular section 15. In combination these sections 14, 15 make a strong and rigid yet extendable pair of tow bars 4, 5. The converging ends of inner sections 14 project outwardly of outer sections 15 and are connected to link 13 in the manner described.

Because of the slidable, telescopic disposition of sections 14, 15 each of the tow bars 4, 5 may be extended from the foreshortened or contracted position of FIG. 2 to an extended position, shown in FIG. 6. Inner sections 14 are each formed with apertures 16 therethrough (FIGS. 4, 5) near both ends thereof (the apertures at one end are not shown because they are covered by outer sections 15) for receiving the locking pins 17 (FIG. 4) of locking devices 18. Each such locking device includes a locking pin 17 mounted in the center of an inverted U-shaped handle 19 and projecting through an aperture 21 in outer section 15. Pin 17 is supported for reciprocating movement in a housing 22, mounted on outer section 15, and is yieldably urged by a spring 23 to project through apertures 21 and 16. In such position locking pin 17 prevents telescopic movement of the associated inner and outer tubular sections 14, 15.

When handle 19 is pulled outwardly of outer section 15 and rotated approximately 90° and downwardly depending legs 24 of said handle may rest on said outer section thereby supporting locking pin 17 in an elevated position where it cannot project through aperture 16. With their associated locking pins 17 in such elevated positions outer sections 15 may slide freely on inner sections 14.

The divergent ends of sections 15 of tow bars 4, 5 are pivotally connected at spaced points to spreader bar 7 by means of brackets 25 (FIG. 3) and pivot bolts 26. Brackets 25 are fixed to the opposed ends of rigid spacer bar 7 and provide outwardly opening yokes which receive the ends of outer portions 15 of tow bars 4, 5. Pivot bolts 26 extending through said yokes and said ends of sections 15 thereby support tow bars 4, 5 for swinging in generally horizontal arcs about the vertical axes of pivot bolts 26.

The elongated spreader bar 7 is provided with means for attaching it to a vehicle 3 to be towed in a position under and behind the bumper 27 (FIGS. 1, 2) or end portion of such vehicle. Such means may be the conventional grab hooks which are intended to be engaged with portions of the under carriage of the towed vehicle 3, such as frame members and the like. Hooks 28 are provided with trailing chains 29 the links of which are adapted to be received in upwardly opening slots or hook members 30 provided at the opposite ends of spreader bar 7. In this manner, by fastening hooks 28 to the under structure of the towed vehicle 3, pulling the chains 29 taut, and engaging the links thereof in the hook members 30, spreader bar 7 may be securely attached to vehicle 3 in a position under and behind the end or bumper 27 of such vehicle.

A tubular member 33 (FIGS. 2, 3, 6) is journalled on spreader bar 7 for the purpose of connecting thereto the flexible suspension means or sling 8. Member 33 is provided with a plurality of pairs of upstanding ears 34 (FIG. 5) each pair of which is adapted to receive therebetween the eye of a suspension member such as flexible cable or wire rope 35. The pairs of ears 34 and therefore cables 35 are preferably arranged in two spaced, parallel pairs as shown in FIG. 2. Each pair of suspension members or cables is connected by pins 36 extending through ears 34 and the eyes at one end of each of said cables at points intermediate the center and opposed ends of member 33. The opposite ends of cables 35 are also provided with eyes for connection to an elongated rigid header bar 37. Header bar 37 is provided with means for connection to said cables in the form of spaced, parallel plates 38, adapted to receive said eyes therebetween, and pins 39 adapted to be received through plates 38 and the eyes on said cable.

Header bar 37 is also provided with apertures 40, 41 for connection to the lifting means 2 on towing vehicle 1, as by hook 9. Central aperture 40 is used for this purpose when the lifting means 2 is provided with only a single hoist cable; whereas the two spaced apertures 41 may be used to connect header bar 37 to a double cable hoisting means. Where the former system is used apertures 41 may receive the loose ends of chains 29 (FIG. 6) so as to hold them out of the way of the towing operation.

When the device of this invention is in the towing position with spreader bar 7 positioned under and behind the bumper 27 at one end of the towed vehicle 3, the sling 8, including the flexible suspension members 35, are adapted to extend out from under said bumper and in front of the end of such towed vehicle 3.

In order to prevent metal-to-metal contact between the sling of this invention and the towed vehicle, and particularly with the decorative portions such as the bumper and grill of such towed vehicle, cables 35 are preferably provided with tubular elements 42 (FIGS. 2, 5, 6) encasing the major portion of the length of each of said cables. Elements 42 may be of any suitable wear resisting cushion material, such as rubber hose with or without reinforcing. Since they extend over a substantial portion of the exposed length of the cables 35 tubular cushion elements 42 protect said cables from wear by rubbing on the metal parts of the towed vehicle 3 and likewise protect said vehicle parts from unsightly scratching and the like by said cables.

A generally rectangular cushion pad 43 is slidably mounted on each of the suspension members or pairs of cables 35 and tubular elements 42. Pads 43 may each be apertured adjacent their four corners for receiving through said apertures the tubular elements 42 with a portion of said pad 43 between said apertures extending over the upwardly directed surfaces of each pair of suspension members 35. Pads 43 are preferably formed of a cushion material such as fabric reinforced belting which has substantial wear resistant characteristics.

Pads 43 are adapted to be positioned on tubular elements 42 and cables 35 between these elements and the bumper 27 or other metal members at the end of the vehicle 3 being towed (FIG. 5). Pads 43 thereby perform the function of assisting in spreading or equalizing the load between the individual cables 35 in each corresponding pair thereof, while at the same time providing further cushioning for the bumper 27 and grill of the towed vehicle 3. It will be noted that pads 43 may be positioned by sliding them along tubular elements 42 so as to engage those portions of the vehicle 3 which are adapted to be protected from contact with cables 35.

The provision of individual slidable pads 43 is further advantageous from the standpoint of wear and replacement. Pads 43 do not, themselves, carry any major load but do aid in the function of equalizing and stabilizing the load between the individual suspension members 35. Pads 43 are, however, subject to wear by abrasion with the portions of the towed vehicle with which they are engaged. This wear of the pads 43 will not effect the strength of the suspension members of sling 8, and, when said pads are sufficiently worn that their cushioning effect is substantially reduced, they may be readily replaced with new pads.

In operation, with the towing device of this invention mounted on a towing vehicle 1, as shown in FIGS. 1, 2, said towing vehicle 1 is positioned adjacent the end of a vehicle 3 to be towed. Locking devices 18 are then manipulated to disengage locking pins 17 from apertures 16 and tow bars 4, 5 extended to the position of FIG. 6 to position spreader bar 7 under and behind the bumper 27 of the towed vehicle 3. Said spreader bar is secured in this position to the vehicle 3 by grab hooks 28 and chains 29, in the manner described. Pads 43 are then adjusted by the towing operator so as to be positioned for engagement with the bumper 27 and/or other portions of the towed vehicle adjacent the end being lifted.

The towing operator may then merely operate the lifting mechanism 2 on the towing vehicle 1 and, with the locking devices 18 in the position of FIG. 4 intermediate the apertures 16 at the ends of tow bars 4, 5, said tow bars will automatically telescope to the foreshortened position of FIGS. 1, 2 as the sling 8 and the end of vehicle 3 are lifted. Upon reaching said foreshortened position, locking pins 17 will drop into the forward apertures 16 to lock tow bars 4, 5 against further movement.

Preferably, hoisting mechanism or derrick 2 is operated to lift sling 8 to the position shown in FIG. 1 with tow bars 4, 5 extending generally horizontally, and with the end of towed vehicle 3 suspended in towing position.

It is important to note that should one of the cables 35 of either pair become worn and frail, no damage will occur to the towed vehicle because the other cable of such pair would be capable of carrying the load. The paired cable arrangement disclosed is therefore preferable to a device which relies on only one suspension member on each side of the sling.

Although the invention has been described and illustrated in detail, such is not to be taken as restrictive thereof, but it is intended to include all modifications that would appear to one skilled in the art to be within the spirit of the invention.

I claim:

1. A towing sling comprising: an elongated, rigid spreader bar adapted to be positioned under and behind the bumper of a vehicle to be towed and having means for attaching it to the frame of such vehicle in such position, a stiff tow bar connected to said spreader bar and extending therefrom for pivotal connection to a towing vehicle for holding such towed vehicle spaced from such towing vehicle, an elongated, rigid header bar having means for connection to lifting means carried by such towing vehicle, spaced pairs of elongated, flexible, parallel, spaced suspension members connected to said spreader bar and said header bar and adapted to extend in front of the bumper of such towed vehicle for normally supporting such towed vehicle, tubular elements of cushion material encasing a major portion of the length of each of said suspension members, and cushion pads extending over a lesser portion of the upwardly directed surfaces of each said pair of suspension members and slidably mounted on said tubular elements of each said pair for positioning between the latter and the bumper of such towed vehicle.

2. A towing sling comprising: an elongated, rigid spreader bar adapted to be positioned under and behind the bumper of a vehicle to be towed and having means for attaching it to the frame of such vehicle in such position, a stiff tow bar connected to said spreader bar and extending therefrom for pivotal connection to a towing vehicle for holding such towed vehicle spaced from such towing vehicle, an elongated, rigid header bar having means for connection to lifting means carried by such towing vehicle, a tubular member journalled for rotation on said spreader bar, spaced pairs of elongated, flexible, parallel, spaced suspension members, and means respectively connecting the opposite ends of said suspension members to said header bar and said tubular member.

References Cited by the Examiner

UNITED STATES PATENTS

| | | |
|---|---|---|
| 2,512,635 | 6/50 | Flowers. |
| 2,567,872 | 9/51 | Burke _____ 294—74 X |
| 2,625,279 | 1/53 | Dalby et al. |
| 2,782,944 | 2/57 | Macklin. |
| 2,796,183 | 6/57 | Cline et al. |
| 2,913,131 | 11/59 | Holmes. |

HUGO O. SCHULZ, *Primary Examiner*.

ERNEST A. FALLER, Jr., MORRIS TEMIN,
*Examiners.*